(12) United States Patent
Wu et al.

(10) Patent No.: US 7,589,288 B2
(45) Date of Patent: Sep. 15, 2009

(54) WHEEL LIFT WEIGHT MEASUREMENT STRUCTURE AND BED BALANCE THEREOF

(75) Inventors: Yi-Chieh Wu, Kao-Hsiung Hsien (TW); Sung-Liang Hsieh, Kao-Hsiung Hsien (TW)

(73) Assignee: Metal Industries Research & Development Centre

( * ) Notice: Subject to any disclaimer, the term of this patent is extended or adjusted under 35 U.S.C. 154(b) by 0 days.

(21) Appl. No.: 11/955,594

(22) Filed: Dec. 13, 2007

(65) Prior Publication Data
US 2009/0151081 A1    Jun. 18, 2009

(51) Int. Cl.
*G01G 19/02*    (2006.01)
(52) U.S. Cl. .................... 177/144; 177/146
(58) Field of Classification Search .......... 177/144, 177/146
See application file for complete search history.

(56) References Cited

U.S. PATENT DOCUMENTS

| | | | |
|---|---|---|---|
| 3,961,675 A | * | 6/1976 | Siegel ................... 177/126 |
| 4,281,730 A | * | 8/1981 | Swersey et al. ............ 177/144 |
| 5,086,856 A | * | 2/1992 | Haggstrom ................. 177/161 |
| 6,717,072 B1 | * | 4/2004 | Winterberg et al. ......... 177/126 |
| 6,765,154 B2 | * | 7/2004 | Sternberg .................. 177/126 |
| 7,381,910 B1 | * | 6/2008 | Wilkerson et al. .......... 177/144 |

\* cited by examiner

*Primary Examiner*—Randy W Gibson

(57) ABSTRACT

A wheel lift weight measurement structure that directly lifts up wheel and a bed balance therefore includes a seat, at least one pedal, a locating mechanism, at least one weight sensor, and a support; one the pedal revolves and is pressed down at where it is pivoted to the frame, the weight sensor pivoted to the pedal holes against and lifts up the body of the support and lifts up the wheels of the sickbed at the same time to perform measurement of weight; the weight measurement is done depending on the quantity of the wheel of the sickbed by having disposed the wheel lift weight measurement structure to each wheel or each wheel on each corner and having the results measured by each wheel lift weight measurement structure transmitted to a measurement device to solve the results before transmitting the results to each display to form a bed balance.

6 Claims, 9 Drawing Sheets

WHEEL LIFT WEIGHT MEASUREMENT STRUCTURE AND BED BALANCE THEREOF

BACKGROUND OF THE INVENTION (1) Field of the Invention

The present invention is related to a bed balance, and more particularly, to one executes measurement by lifting up a wheel that supports the sickbed.

(2) Description of the Prior Art

Monitor of the weight of a patient is part of the information needed to control the condition of the patient. However, for patient to be sick abed, it is very difficult to measure the weight of the patient. So far several means are available, e.g., having the patient suspended or having a balance directly mounted to the sickbed to measure the total weight of the patient and the sickbed and the patient is not needed to leave the sickbed, the weight of the patient is solved by having the total weight measured to be subtracted with weight of the empty bed. But this type of sickbed is too expensive to make it popular. Alternatively, a measurement device is mounted under the bed; however, it is not practical in use since it prevents easy movement of the sickbed onto the device and other devices are needed to lift up the sickbed to place the bed legs on the device.

A bed balance is comprised of multiple measuring feet and computer to measure; however, the measuring feet have a rocker placed in a wheel, and the user presses an activating lever; whereas the bed is heaving that those measuring feet, the bed balance will have the rocker as a support when the activating lever is pressed for a roller to entirely slide into where below the rocker placed with the wheel to complete the preparation before having the built-in balance to measure the weight at that point.

However, the bed balance has its flaw of preventing easy operation. Upon mounting the bed balance, the activating lever must be pressed down to the floor; and it is not easy to control the force to slide the roller. After the activating lever passes over a certain degree, the roller friction gets smaller to result in mild shaking of the bed and sound of impact at the moment the device slides into the wheel of the sickbed for the patient to feel discomfort or frightened. Furthermore, the bed balance is not convenient since it will cause the sickbed to displace.

SUMMARY OF THE INVENTION

The primary purpose of the present invention is to provide wheel lift measure structure by directly lifting up the wheel comprised of a seal, one or a plurality of pedal, a locating mechanism, one or a plurality of weight sensor, and a support. When the pedal is pressed at where a frame is pivoted, the weight sensor pivoted to the pedal will hold and lift up the support. Whereas the support of the present invention is driven by the pedal, the support carries the wheel of the sickbed to lift up or move down without producing side displacement, thus the present invention will not create instant sound of impact to disturb the patient in the sickbed.

The locating mechanism is comprised of a slide in conjunction with a slider provided with a push button to facilitate the user to secure the location of the pedal; and the present invention achieves cost reduction by saving materials and process otherwise required in providing tenon and pivot for the activating lever to execute locating and storing actions as found with the prior art.

An arc plate is further disposed on one end of the weight sensor to facilitate smooth movement of relative positions between the weight sensor and the support when the support is lifted up or placed down while achieving vertical ascending of the wheels of the sickbed without causing the sickbed to shake as found with the prior art.

The base is made in two tubes with multiple anti-slip pads disposed on their bottoms to firmly secure without sliding.

A U-shaped mast is provided externally to the support to prevent ingress of foreign matter that may affect the measurement results and to guide the traveling route of the support when the support ascends.

The measurement may be done depending on the quantity of the wheels of the sickbed. Usually, four wheels are provided to a sickbed, and the measurement device is disposed to each wheel or each wheel on each corner. The measurements from each wheel lift measurement structure are transmitted to the measurement device and solved before transmitting the results to display on each display to form a bed balance.

DETAILED DESCRIPTION OF THE PREFERRED EMBODIMENTS

Figure 1:
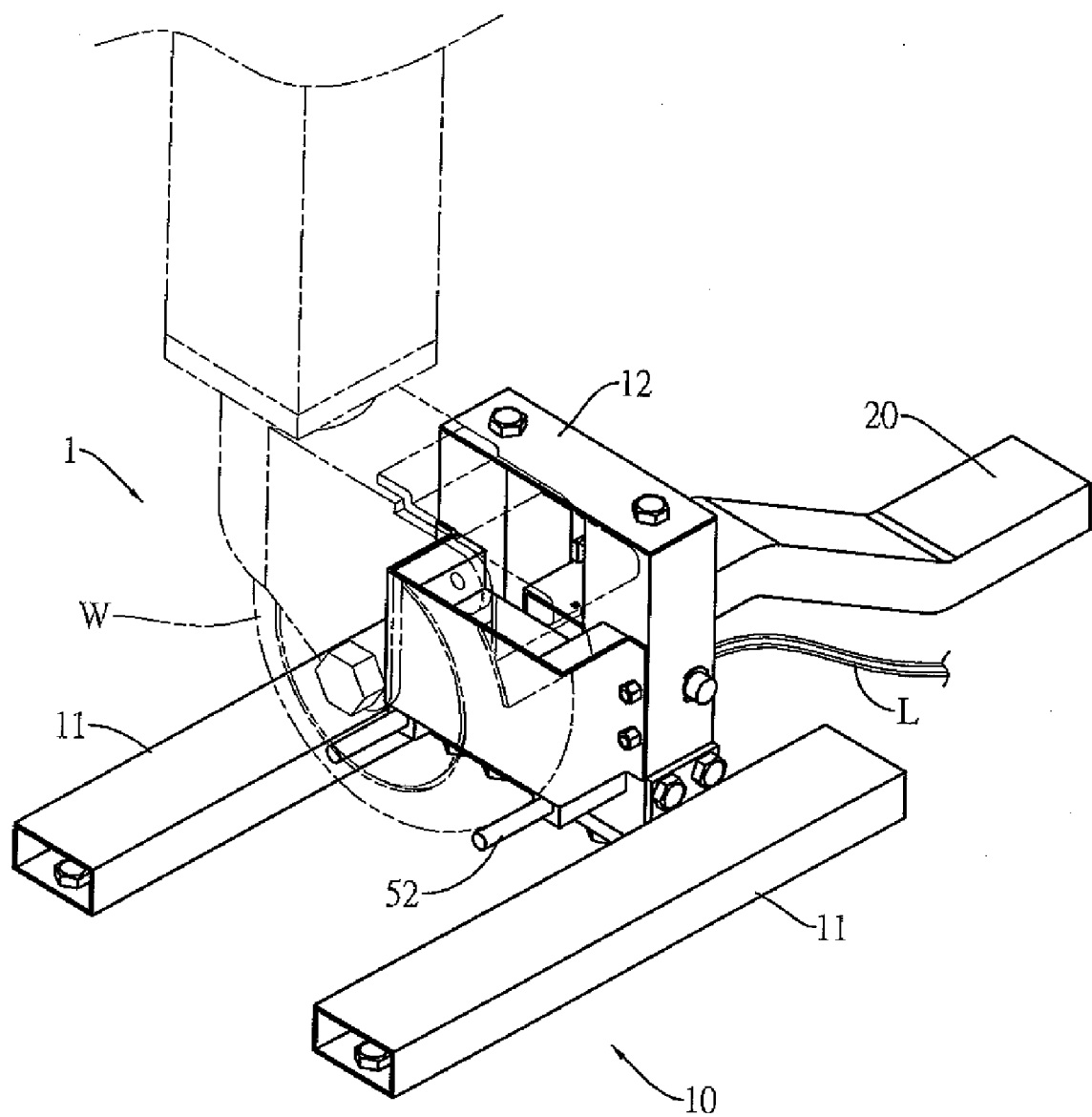
FIG. 1 is a perspective view of a preferred embodiment of the present invention.
Figure 2:
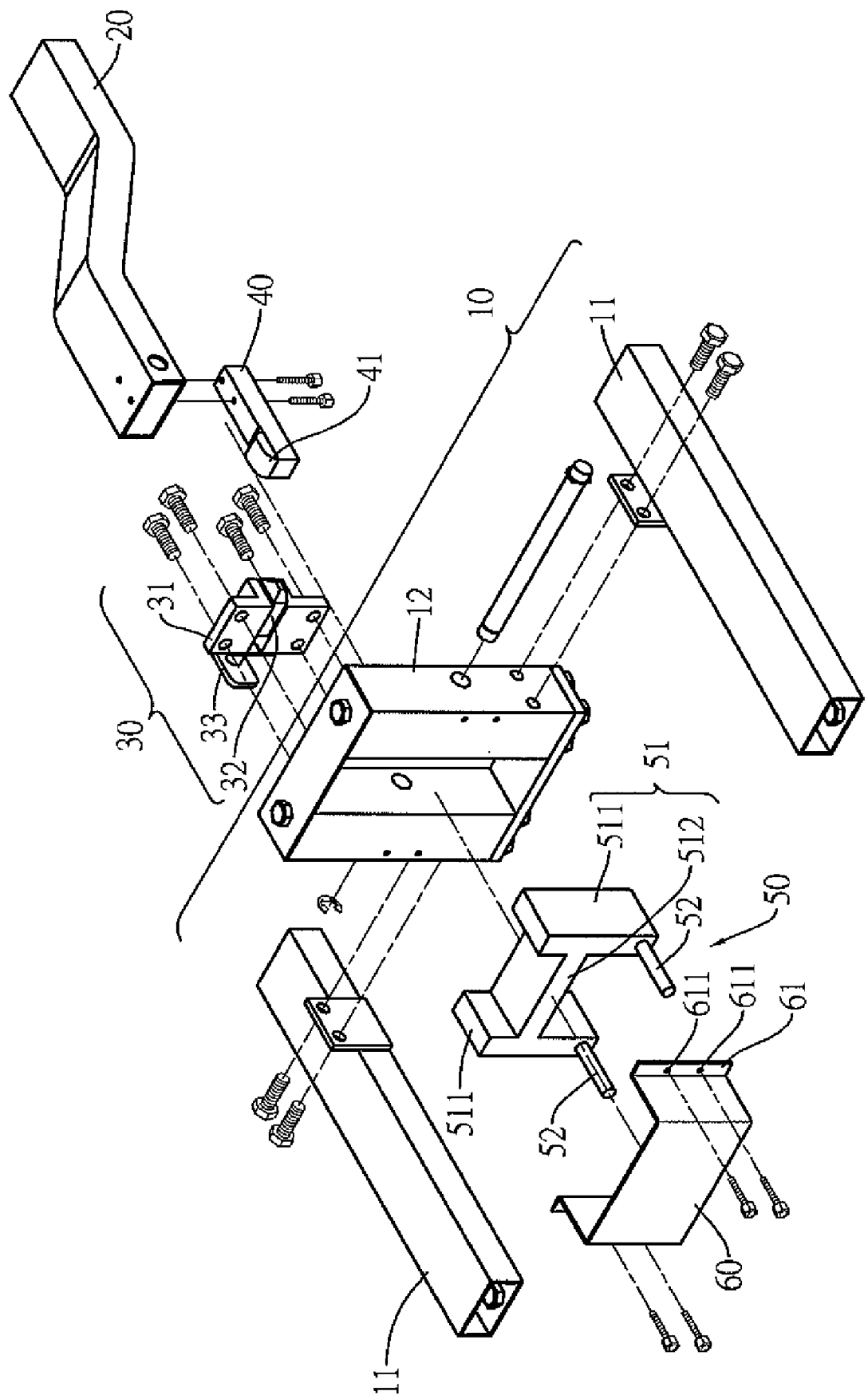
FIG. 2 is an exploded view of the preferred embodiment of the present invention.
Figure 3:
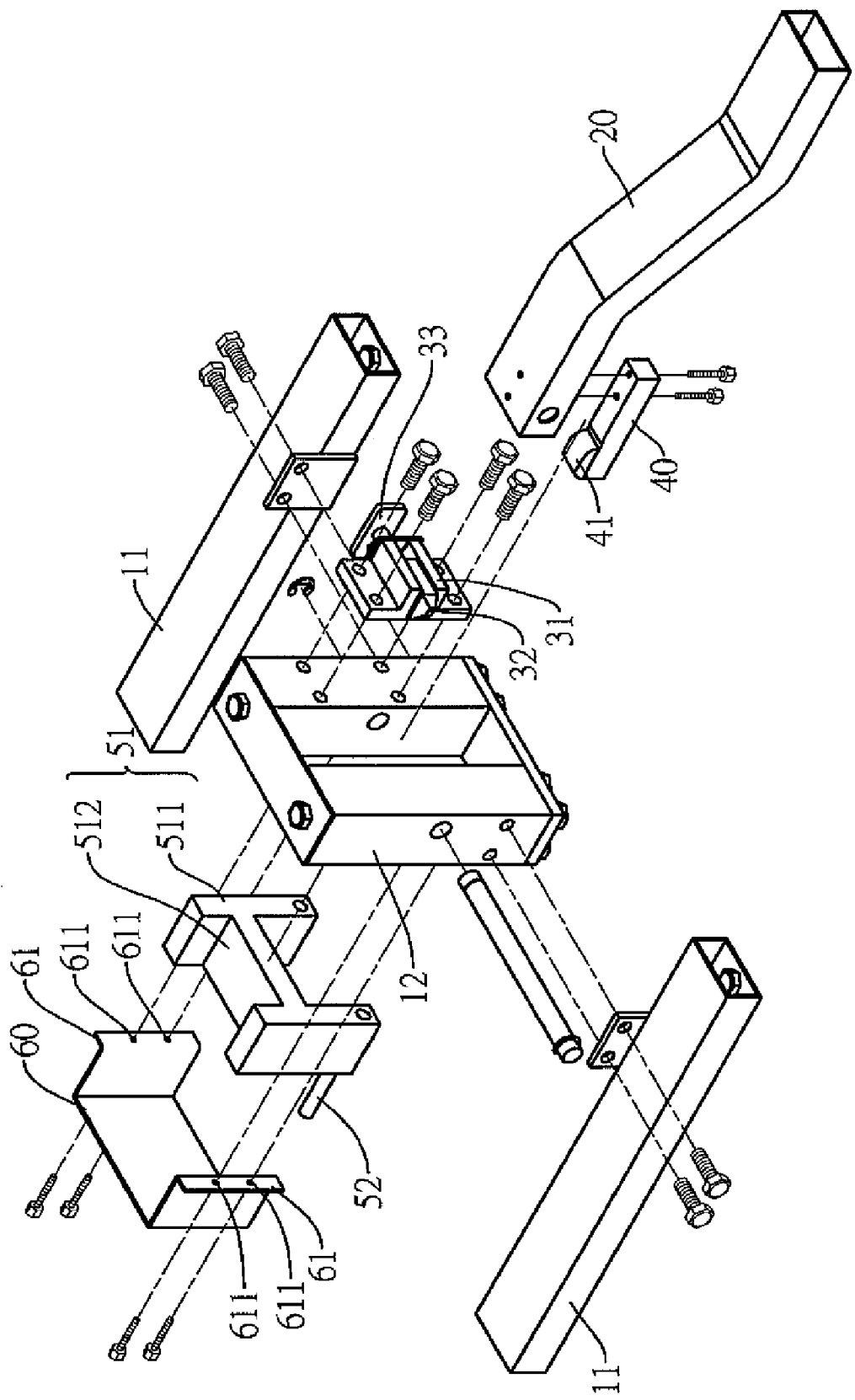
FIG. 3 is another exploded view of the preferred embodiment of the present invention.

Referring to FIGS. 1, 2, and 3, a wheel-lift weight measurement structure 1 directly placed below a wheel W; the wheel is then lifted either by steeping of pressing to perform the measurement. The structure 1 is comprised of a seat 10, one or a plurality of pedal 20, a locating mechanism 30, one or a plurality of weight sensor 40, and a support 50. Wherein the seat 10 includes one or a plurality of base 11 and a frame 12 with the frame 12 connected to the base 11; the pedal 20 is pivoted to the frame 12 and operates in relation to the frame 12; the weight sensor 40 is connected to one end of the pedal 20 for the weight sensor 40 to link to the pedal 20 for operation; the locating mechanism 30 secures the location of the pedal 20 so that the user does not have to always step on or press on the pedal 20; the support 50 includes a body 51 and two clamping rods 52 with each clamping rod 52 protruding from the same side of the body 51; a shortest range between those two clamping rods 52 is smaller than a diameter of the wheel W so to drive the wheel W to synchronously ascend or descend; another end of the weight sensor 40 holds against the body 51 for the body 51 to be driven by the weight sensor 40; when the pedal 20 turns downward at where it is pivoted to the frame 12, the weight sensor 40 connected to the pedal 20 holds against the support 50 and is lifted; and the locating mechanism 30 secures the location of the pedal to measure correct figures under a stable status.

Figure 4:
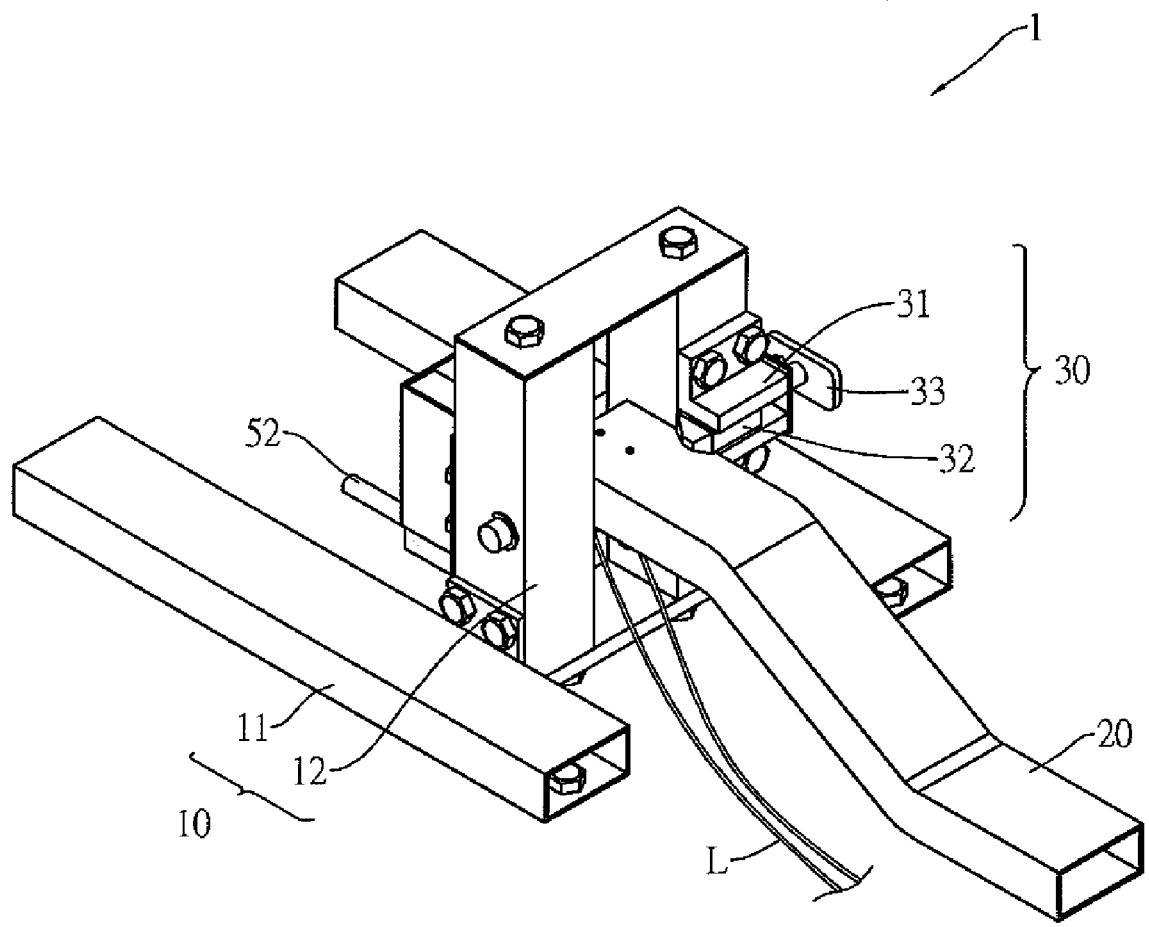
FIG. 4 is another perspective view of the preferred embodiment of the present invention.
Figure 5:
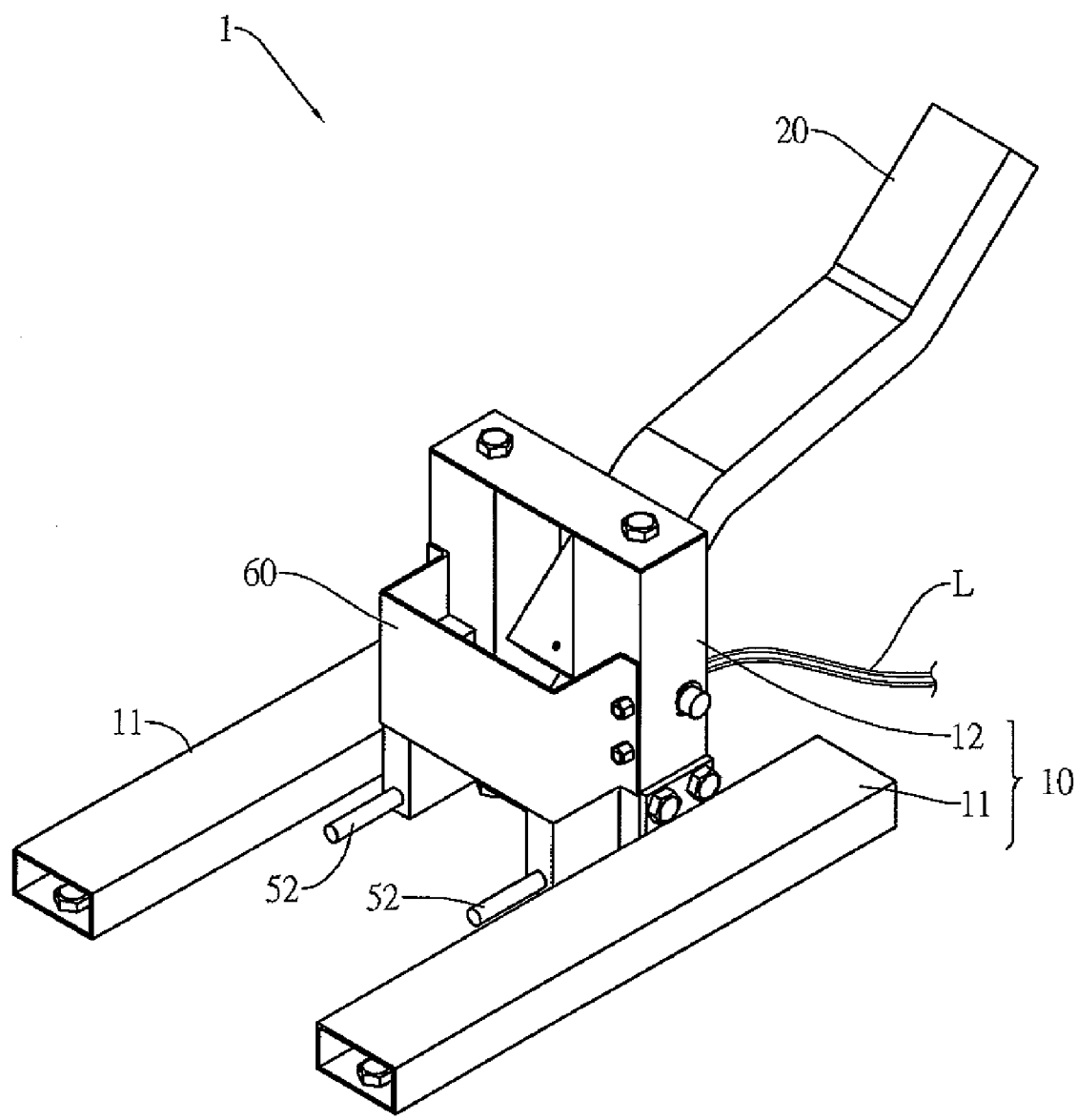
FIG. 5 is another perspective view yet of the preferred embodiment of the present invention.
Figure 6:
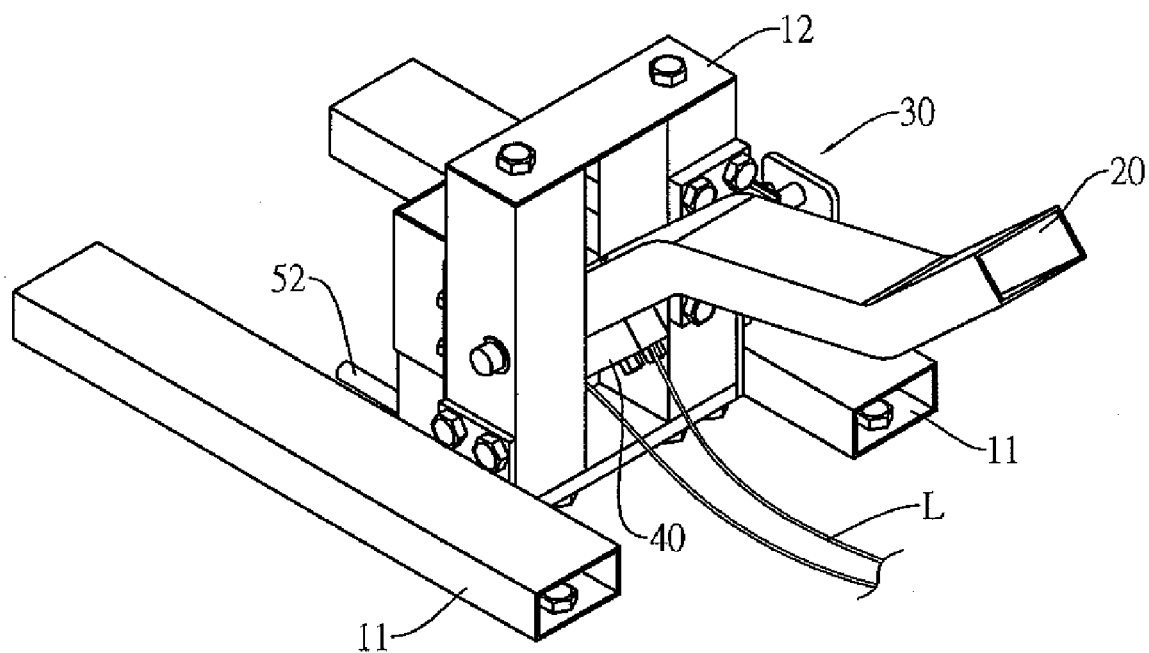
FIG. 6 is another perspective view yet of the preferred embodiment of the present invention.

Now referring to FIGS. 2, 3, and 4, the locating mechanism includes a slide 31 and a slider 32, the slide 31 is connected to the frame 12 and the slider 32 is disposed in the slide 31 with one end of the slider 32 connected to a push button 33 for the user to control the location of the slider 32 in the slide 31 by the push button 33. Wherein, the length of the slider 32 may be roughly equal to or longer than that of the slide 31. Therefore, when the slider 32 is pushed to a give depth, the front end of the slider 32 will be exposed out of the slide 31. In the preferred embodiment, when the pedal 20 is turned down to a certain extent, the user pushes the push button 33 for the slider 32 to expose out of the slide 31 so to stop the pedal from turning upward so that the pedal 20 will not return to its original place due to the suspended applying force by the user. Meanwhile, the mechanism in operation is maintained for a certain period of standstill to obtain even accurate numeric value. The similar purpose can be achieved by having a hole on one side of the pedal 20 to receive insertion of the slider 32 to sop the pedal from turning. Whereas there are many means to provide the locating mechanism, and any locating mechanism as long as the same locating results shall be deemed as an equivalent to the locating mechanism of the present invention.

Figure 7:
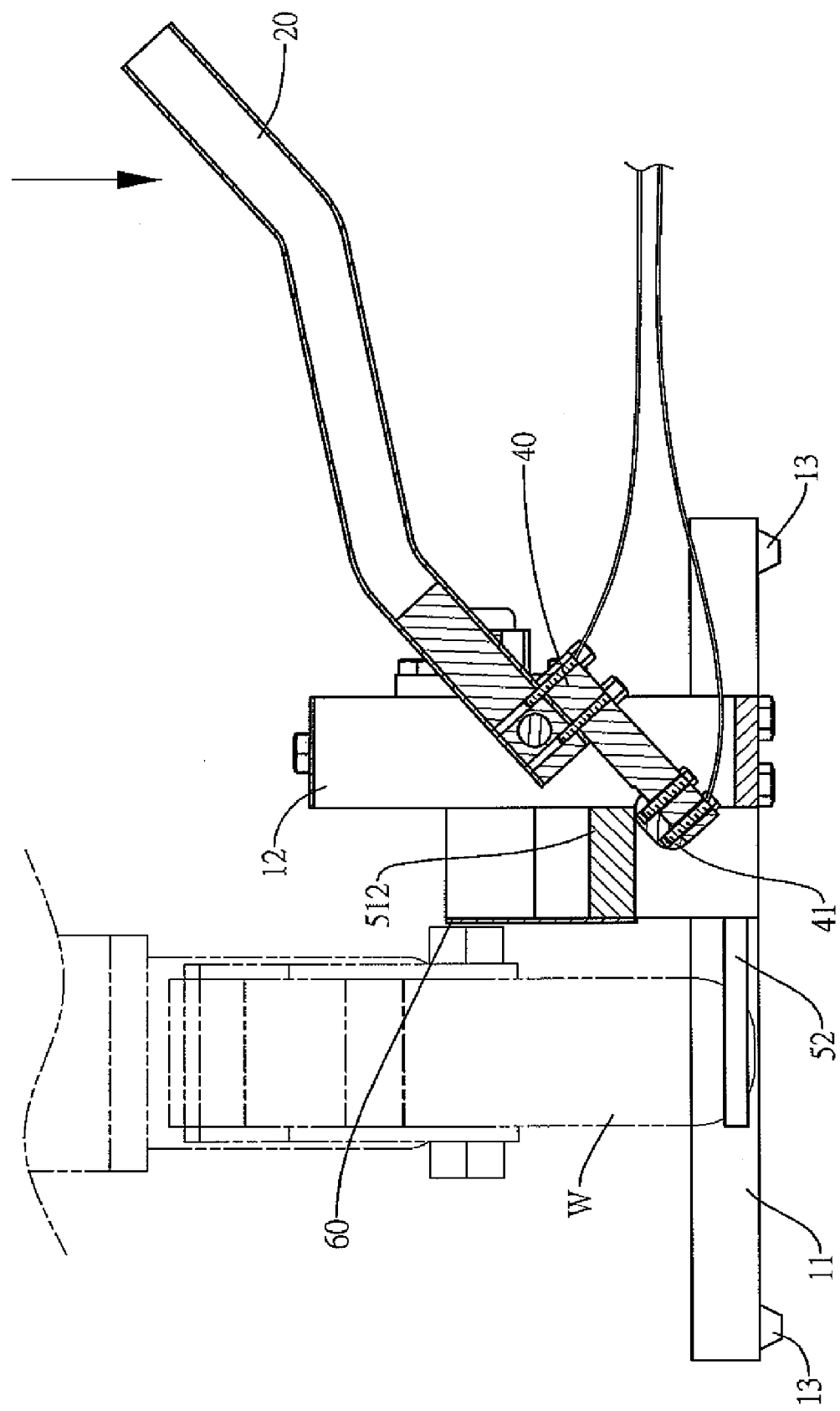
FIG. 7 is a sectional view showing an operating status of the preferred embodiment of the present invention.
Figure 8:
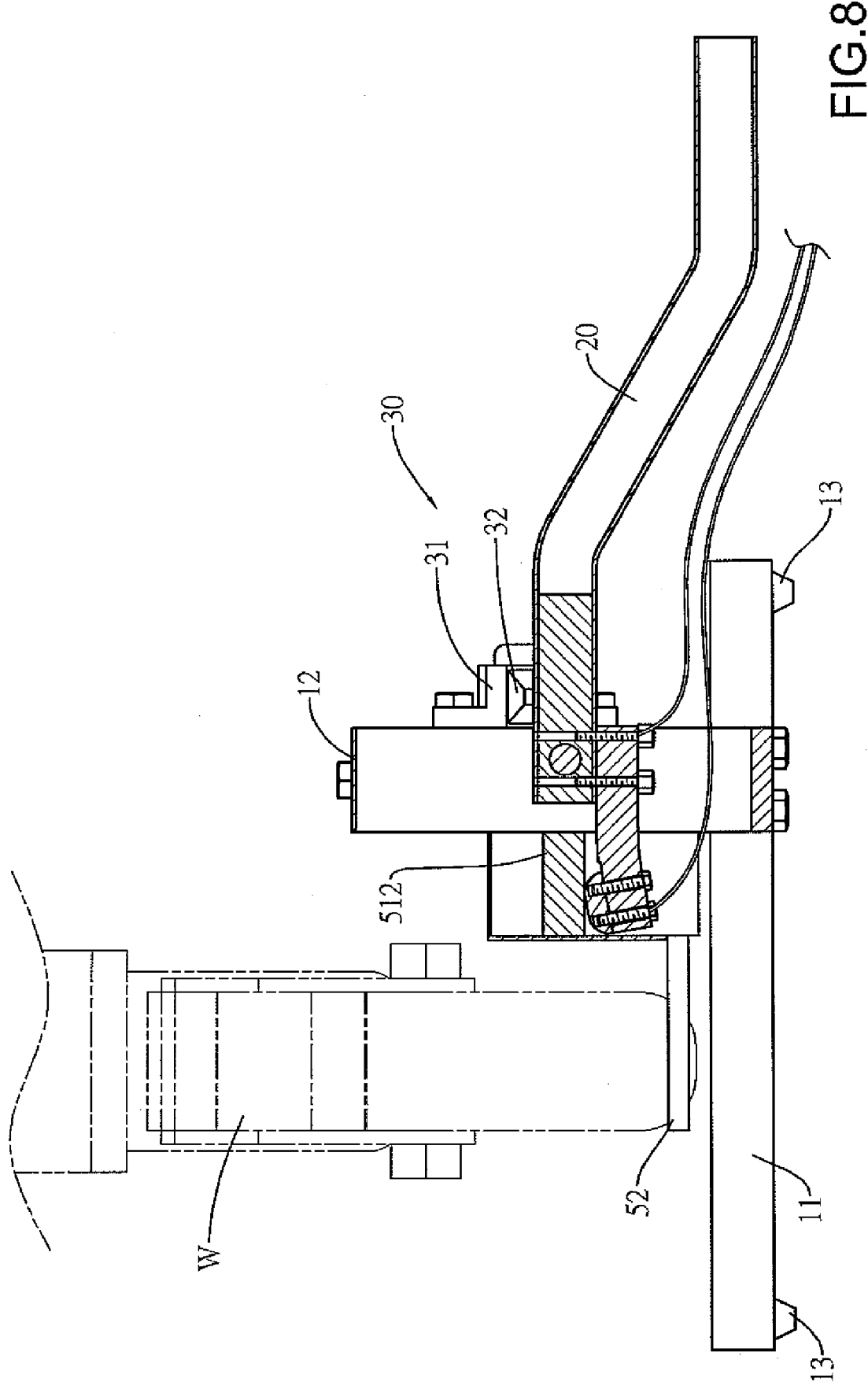
FIG. 8 is another sectional view showing an operating status of the preferred embodiment of the present invention.

As illustrated in FIG. 7, the support body 51 includes two vertical pillars 511 and a lateral beam 512 with the lateral beam 512 connected to where between those two vertical pillars in roughly showing an H-shape. Those two clamping rods 52 are disposed to those two vertical pillars 511 and the weight sensor 40 holds against where below the lateral beam 512.

An arc plate 41 is disposed to an end of the weight sensor 40 to contact the lateral beam 512 to facilitate operation without causing tear and wear to the weight sensor 40 and to assure that the present invention or the sickbed will not produce lateral displacement; furthermore, the weight sensor 40 connects to at least one transmission wire L to measure or transmit signals from the weight sensor 40.

A U-shaped mask 60 is connected to the base and provided externally to the support body 51 of the support 50; however leaving the clamping rods 52 exposed and terminals of both sides of the mask 60 externally extends to form a locking portion 61; the locking portion includes multiple locking holes 611 to be secured to the body by means of screws of other fasteners.

In the preferred embodiment, the base 11 is related to two tubes in symmetric structure to respectively incorporate vertically to both sides of the frame 12 so to allow the user maintains stable in pressing or stepping on the pedal 20 while multiple ant-slip pads are disposed on the bottom of each tube to increase the stability of each tube as illustrated in FIG. 7.

As illustrated in FIGS. 3, 4, 5, 6, 7 and 8, two clamping rods 52 are respectively placed before and after the wheel W, and then the pedal 20 is pressed for the weight sensor connected to the front end of the pedal 20 is lifted to hold against the support body 51 while the clamping rod 521 drives the wheel W to be lifted up for directly transmit to the clamping rod 521 the weight the wheel W is subject to, the slider 32 on the locating mechanism 30 is pushed in to stop the pedal 20 from moving and to maintain standstill status. Whereas the central gravity sustained by the wheel W will direct transmit through the support 50 to the weight sensor 40, the weight sensor 40 is curved and the weight is inferred through linkage of other measurements. The weight sensor 40 in the preferred embodiment is related to a conductive material, and a downward force is crated on the weight sensor 40 when a load appears on the support 50 to bend the weight sensor while causing its resistance to change, and the size of force sustained by the weight sensor can be solved by taking advantage of those changes in variances.

Figure 9:
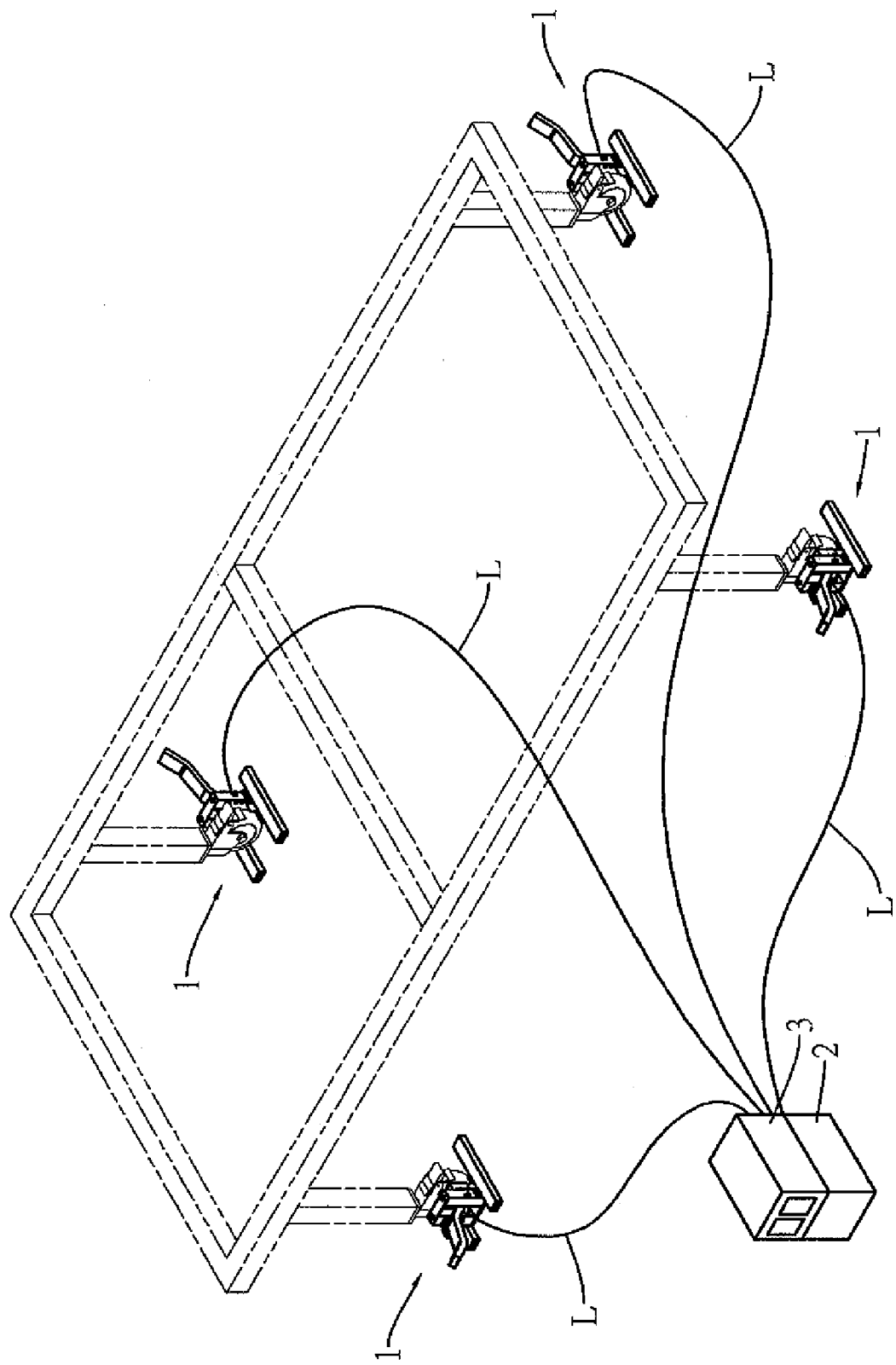
FIG. 9 is a schematic view showing the preferred embodiment of the present invention.

As illustrated in FIG. 9, a sickbed is usually provided with four wheels W, one wheel lift weight measurement structure is each disposed to all four wheels to form a bed balance with each bed balance includes at least four wheel lift weight measurement structures 1, one or a plurality of measurement devices 2, and one or a plurality of display 3; a conduction wire L connected each weight sensor 40 and the measurement device 2 to convert the changes of the weight sensor 40 into measurement results to be displayed on the display 3 for the user to read the information as measures.

However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

What is claimed is:

1. A wheel lift weight measurement structure comprising:
a seat including one or a plurality of base and a frame;
one or a plurality of pedal, pivoted to the frame;
a locating mechanism to secure the pedal in position, wherein the locating mechanism includes a slide connected to the seat and a slider with one end connected with a push button and the slider is disposed in the slide;
a support including a body and at least two clamping rods protruding on the same side of the body;
one or a plurality of weight sensor with one end connected to the pedal and another end connected to the body of the support;
wherein when the pedal turns on its pivot, the weight sensor pivoted to the pedal holds against and lifts up the body of the support.

2. The wheel lift weight measure structure as claimed in claim 1, wherein the body of the support includes two vertical pillars and a lateral beam, and the lateral beam is connected to where between those two vertical pillars.

3. The wheel lift weight measure structure as claimed in claim 2, wherein an arc plate is disposed to one end of the weight sensor.

4. The wheel lift weight measure structure as claimed in claim 3, wherein, the base is related to two tubes with multiple anti-slip pads disposed on the bottoms of those two tubes.

5. The wheel lift weight measure structure as claimed in claim 4, wherein a U-shaped mask is connected to the seat and disposed externally to the body with terminals on both ends of the mask externally extending to form a locking portion, and the locking portion contains multiple locking holes.

6. A bed balance comprising
at least four wheel lift weight measurement structures with each structure comprising:
a seat including at least one base and a frame;
a wheel lift weight measurement structure including:
at least one pedal pivoted to the frame;
a locating mechanism to secure the location of the pedal including:
a slide connected to the seat;
a slider with one end connected with a push button, and the slider is disposed in a locating channel;
a support including a body and at least two clamping rods with both rods protruding out of the same side of the body; the body includes to vertical pillars and a lateral beam connected to where between those two vertical pillars;

at least one weight sensor with one end connected to the pedal and another end disposed with an arc plat to hold against the body of the support;

when the pedal revolves at where it is pivoted to the frame, the weight sensor pivoted hold against and drive the body of the support to lift up;

at least one measurement device connected to each weight sensor by means of a conduction wire to convert the changes of the weight sensor into measurement results; and at least one display connected to the measurement device to display measurement results.

* * * * *